United States Patent [19]

Genser

[11] Patent Number: 4,813,728
[45] Date of Patent: Mar. 21, 1989

[54] GARDENING TOOL AND METHOD

[76] Inventor: Herman J. Genser, 5030 N. Marine Dr., Apt. 1901, Chicago, Ill. 60640

[21] Appl. No.: 107,960

[22] Filed: Oct. 13, 1987

[51] Int. Cl.⁴ .............................................. A01B 1/18
[52] U.S. Cl. .................................................. 294/50.8
[58] Field of Search ............... 294/50.8, 50.6, 50.7, 294/50.5, 50, 53.5, 16, 118; 172/22, 92, 99; 30/316

[56] References Cited

U.S. PATENT DOCUMENTS 626,959   6/1899  Judd .
843,765   2/1907  Nicholson .
973,188  10/1910  Francisco .
1,576,969  3/1926  Hackenberger .
1,663,999  3/1928  Singletary .
2,451,952 10/1948  Hulsebus .
2,735,712  2/1956  Hart ................................. 294/50.5
4,042,270  8/1977  Weiland .

Primary Examiner—James B. Marbert
Attorney, Agent, or Firm—Balogh, Osann, Kramer, Dvorak, Genova & Traub

[57] ABSTRACT

A gardening tool comprising a pair of handles having upper ends and opposed lower scoops with sharp ends at a lower end thereof, and a device for pivotally connecting the scoops intermediate ends of the scoops.

6 Claims, 2 Drawing Sheets

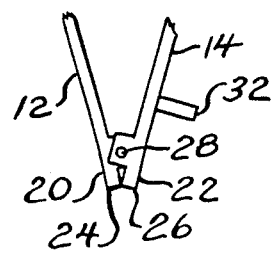
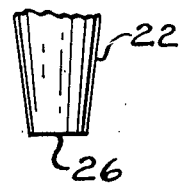
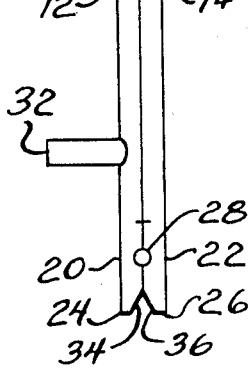
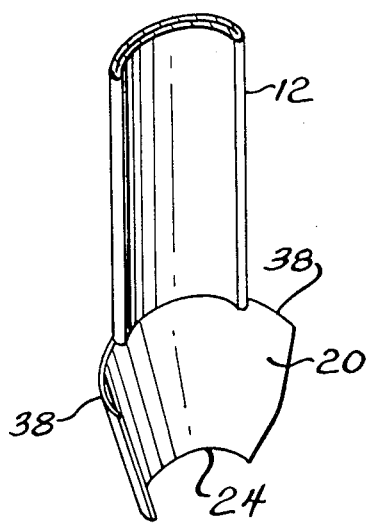
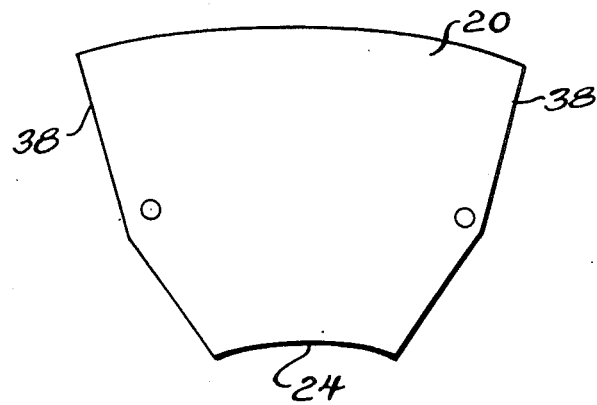

"4,813,728"

GARDENING TOOL AND METHOD

BACKGROUND OF THE INVENTION

The present invention relates to gardening tools.

Before the present invention, various device such as post hole diggers and the like for forming an opening in the ground are known, such as U.S. Pat. Nos. 973,188, 2,735,712, 4,042,270, 843,365, 1,663,999 and 626,959. However, it is desirable to form tapered openings in the ground in order to plant seedlings in the ground, and these devices are not suitable for this purpose.

SUMMARY OF THE INVENTION

A feature of the present invention is the provision of an improved gardening tool.

The gardening tool of the present invention comprises, a pair of handles having upper ends and opposed lower scoops with sharp ends at a lower end thereof, and means for pivotally connecting the scoops intermediate ends of the scoops.

A feature of the present invention is that the lower end of the scoops pinch the ground as the upper ends of the handles are spread.

Another feature of the present invention is that an upper portion of the scoops spread the ground above the pivot means as the upper end of the handles are spread.

A feature of the invention is that the pinched dirt may be removed by the scoops.

Another feature of the invention is that the tool forms a tapered opening.

Still another feature of the invention is that a plant having a dirt base may be placed in the opening.

Another feature of the present invention is the provision of a method of planting.

Further features will become more fully apparent in the following description of the embodiments of this invention and from the appended claims.

DESCRIPTION OF THE DRAWINGS

In the drawings:

FIG. 6 is a fragmentary elevational view showing the tool with scoops being moved together;

FIG. 7 is a fragmentary side elevational view of a lower scoop of FIG. 1;

FIG. 8 is a fragmentary elevational view of another embodiment of the present invention; and FIG. 9 and 10 are perspective views of another embodiment of the present invention.

DESCRIPTION OF THE PREFERRED EMBODIMENTS

Figure 1:
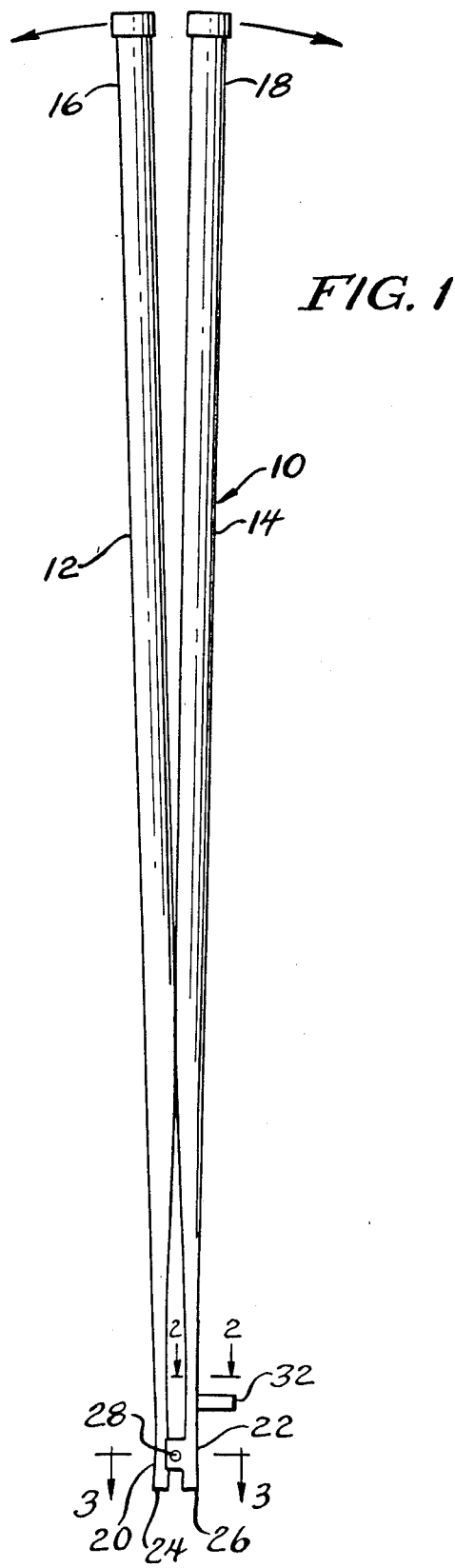
FIG. 1 is an elevational view of a gardening tool of the present invention.
Figure 2:
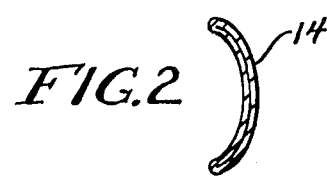
FIG. 2 is a sectional view taken substantially as indicated along the line 2—2 of FIG. 1.
Figure 3:
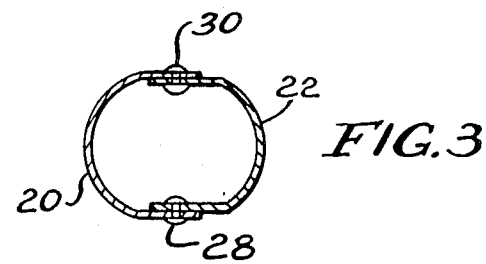
FIG. 3 is a sectional view taken substantially as indicated along the line 3—3 of FIG. 1.

Referring now to FIGS. 1–3, there is shown a gardening tool generally designated 10 having a pair of elongated handles 12 and 14 having respective upper ends 16 and 18 and opposed lower scoops 20 and 22 with sharp ends 24 and 26 at the lower end thereof. The scoops 20 and 22 have a pair of opposed pivot pins 28 and 30 at a generally central longitudinal location of the scoops 20 and 22, and pivotally connecting the scoops 20 and 22 intermediate opposed ends thereof. As shown in FIG. 7, the scoops are preferably tapered toward the sharp lower end.

As shown in FIG. 2 the handles including the scoops 20 and 22 are flattened and obstructed throughout the length of the scoops 20 and 22 for a purpose which will be described below. The handle 14 has a foot pad 32 adjacent the scoops 22 such that the pad 32 may be pressed by the foot to drive the scoops into solid dirt.

Figure 4:
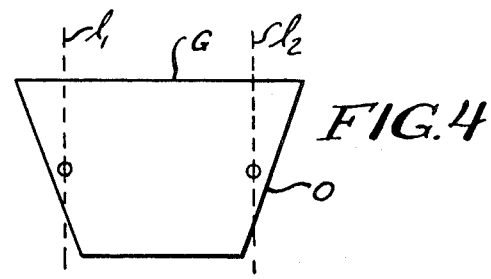
FIG. 4 is a diagrammatic view showing an opening formed by the tool of FIG. 1 in the ground.

In use, with reference to FIGS. 1 and 4, the handles 12 and 14 are utilized to press the scoops 20 and 22 into the ground at the location of the lines $l_1$ and $l_2$ until the pivot pins 28 and 30 are located at a location substantially beneath the level of the ground G. The upper ends 16 and 18 of the handles 12 and 14 are then spread outwardly, such that the lower ends of the scoops 20 and 22 pinch the dirt beneath the pivot pins 28 and 30, as shown in FIG. 6, and the upper ends of the scoops 20 and 22 spread the dirt at a location above the pivot pins 28 and 30 to form the tapered opening O, as shown in FIG. 4. The handles are then raised to extract the dirt by the scoops 20 and 22 and leave the tapered opening O.

Figure 5:
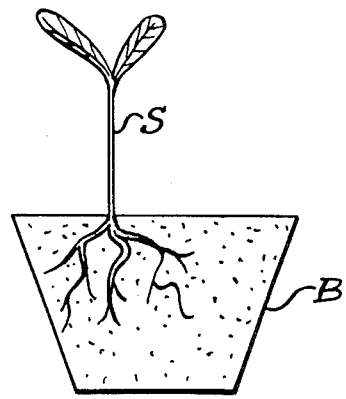
FIG. 5 is a diagrammatic view of a plant for placement in the opening of FIG. 4

With reference to FIG. 5, a seedling S having a tapered dirt base B preferably the same size as the opening is then placed into the opening O which is automically formed by the tool 10. The size of the tool 10 preferably is formed to shape the desired opening O to the same size of the ssedling base B.

When the tool 10 is placed in the ground, the unobstructed scoops, as previously described, permit free passage of dirt upwardly along the scoops 20 and 22 such that the dirt emerges at the top of the scoops 20 and 22.

Another embodiment of the present invention is illustrated in FIG. 8, in which like reference numerals designate like parts. In this embodiment, the scoops 20 and 22 have inner tapered portions 34 and 36 to facilitate movement of the lower end of the scoops together to pinch dirt when the handles are spread.

Another embodiment of the present invention is illustrated in FIGS. 9 and 10, in which like feference numerals designate like parts. In this embodiment the scoops such as 20 have outward flared side portions 39 extending past the respective handles 12 to facilitate pinching of the dirt.

According to a method of planting of the present invention, scoops at the end of a pair of handles including pivot points are inserted into the ground, the handles are spread while pinching dirt at a lower end of the scoops and while spreading dirt with an upper end of the scoops, removing the pinched dirt from the ground to form a tapered opening, and placing a plant have a tapered dirt base into the opening.

The foregoing detailed description is given for clearness of understanding only, and no unnecessary limitations should be understood therefrom, as modifications will be obvious to those skilled in the art.

I claim:

1. A gardening tool, comprising:
    a pair of handles having upper ends and opposed lower scoops with sharp ends at the lower end thereof, said scoops being free of obstruction on the inside throughout their length, said handles having intermediate portions abutting each other to define a handling space between the upper ends of said handles to avoid pinching of hands of an operator and positioning said scoops parallel to each other to define a sharp entry perpendicular to the surface of the ground, and means for pivotally connecting the scoops intermediate ends of the scoops, such that the scoops including the pivot means may be pressed beneath the level of the ground, a foot pad secured to an exterior surface of one of said handles and extending transversely outwardly, said foot pad being positioned a predetermined distance upwardly of said pivot means, said foot pad being instrumental in placing said pivot means a predetermined distance below the surface of the ground, whereby spreading apart the upper ends of said handles defines a wedging action by the pivot means to compress together the ground on the interior of the scoops and to compress the ground on the exterior of said scoops to define an outwardly tapered hole adapted to receive a correspondingly shaped potted plant.

2. The tool of claim 1 wherein the pivot means is located generally centrally along the length of the scoops.

3. The tool of claim 1 wherein the scoops are tapered in side dimensions toward the sharp ends.

4. The tool of claim 1 wherein the scoops have inwardly tapered portions extending toward the sharp ends.

5. The tool of claim 1 wherein the scoops have outwardly flared side portions extending past the handles.

6. A method of planting, comprising the steps of:
 inserting scoops at the end of a pair of handles including a pivot point beneath the level of the ground, said pivot point being inserted at least one-half of the length of the scoops into the ground;
 spreading the handles while pinching dirt with a lower end of the scoops below the pivot point and spreading the dirt with an upper end of the scoops above the pivot point;
 removing the pinched dirt from the ground to form a tapered opening; and
 placing a plant having a tapered dirt base into the opening.

* * * * *